United States Patent [19]
Brault et al.

[11] Patent Number: 5,054,373
[45] Date of Patent: Oct. 8, 1991

[54] COMPOSITE MATERIAL FLEXIBLE SEPARATORS FOR PRESSURE VESSELS

[75] Inventors: François Brault, Paris; Alain Jaunet, Montigny Les Cormeilles; Marc Mendowski, Beaumont Sur Oise, all of France

[73] Assignee: Olaer Industries, Beaumont sur Oise, France

[21] Appl. No.: 519,872

[22] Filed: May 7, 1990

[30] Foreign Application Priority Data

Jan. 19, 1990 [FR] France .................................. 90 00596

[51] Int. Cl.$^5$ ......................... F01B 19/00; F16J 3/00; F16L 55/04
[52] U.S. Cl. ........................................... 92/92; 92/96; 92/99; 92/103 R; 92/103 M; 138/30; 220/85 B
[58] Field of Search ............... 92/92, 96, 98 R, 103 R, 92/103 F, 103 SD, 99, 103 M; 138/30; 241/85 B; 428/35.3, 35.9, 212, 213, 457, 461; 29/450, 451, 469, 469.5, 525, 773, 776

[56] References Cited

U.S. PATENT DOCUMENTS

| | | | |
|---|---|---|---|
| 1,229,860 | 6/1917 | Ashelman et al. | 92/103 R |
| 1,473,998 | 11/1923 | Mixsell | 92/103 R |
| 1,695,534 | 12/1928 | Carter | 92/103 R |
| 1,783,646 | 12/1930 | Hajek | 92/103 R |
| 2,532,143 | 11/1950 | Breit | 138/30 |
| 2,889,078 | 6/1959 | Thomas | 220/85 B |
| 3,083,734 | 4/1963 | Taplin | 92/103 R |
| 3,135,173 | 6/1964 | Jack, Jr. | 92/103 R |
| 3,173,342 | 3/1965 | Wilson | 92/103 R |
| 3,221,742 | 12/1965 | Orowan | 428/35.3 X |
| 3,340,714 | 9/1967 | Pohl et al. | 29/469.5 X |
| 3,442,293 | 5/1969 | Erdmann | 138/30 |
| 3,526,580 | 9/1970 | Webb | 204/30 |
| 3,668,978 | 6/1972 | Bowen | 92/98 R |
| 4,050,358 | 9/1977 | Humberstone et al. | 92/103 F |
| 4,129,025 | 12/1978 | Carey et al. | 138/30 X |
| 4,158,718 | 6/1979 | Kehl et al. | 428/461 |
| 4,278,716 | 7/1981 | Buchner et al. | 428/461 X |
| 4,309,466 | 1/1982 | Stillman | 428/461 X |
| 4,310,578 | 1/1982 | Katsura et al. | 428/35.3 X |
| 4,337,285 | 6/1982 | Akoo et al. | 428/35.3 |
| 4,351,363 | 9/1982 | Haug et al. | 138/30 |
| 4,447,519 | 5/1984 | Pritikin | 428/461 X |
| 4,588,646 | 5/1986 | Athey, Jr. | 428/461 X |
| 4,743,479 | 5/1988 | Nakamura et al. | 428/213 X |
| 4,777,982 | 10/1988 | Borowitz et al. | 138/30 |
| 4,844,944 | 7/1989 | Graefe et al. | 428/213 X |

FOREIGN PATENT DOCUMENTS

| | | |
|---|---|---|
| 0100221 | 2/1984 | European Pat. Off. . |
| 0322294 | 6/1989 | European Pat. Off. ............. 138/30 |
| 2419557 | 11/1975 | Fed. Rep. of Germany ........ 138/30 |
| 2817011 | 10/1979 | Fed. Rep. of Germany ........ 138/30 |
| 8507638 | 8/1986 | Fed. Rep. of Germany . |
| 2060072 | 4/1981 | United Kingdom ................. 138/30 |

OTHER PUBLICATIONS

Japanese patent abstract for Japanese patent application No. 63 190902, vol. 12, No. 466 (M-772)(3313), Dec. 7, 1988 (NOK Corp.).

*Primary Examiner*—Edward K. Look
*Assistant Examiner*—John Ryznic
*Attorney, Agent, or Firm*—Charles A. Brown

[57] ABSTRACT

A pressure vessel contains a flexible separator comprising three layers, an outer layer, an inner layer and an intermediate layer which is at least partly impermeable to gases. The intermediate layer comprises a metal film. A particular application of the pressure vessel is to braking circuits.

24 Claims, 3 Drawing Sheets

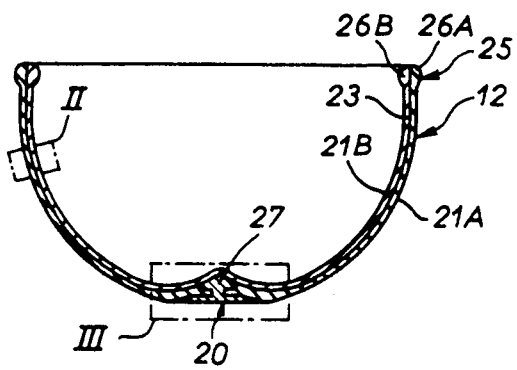
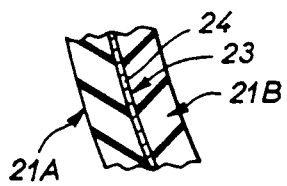
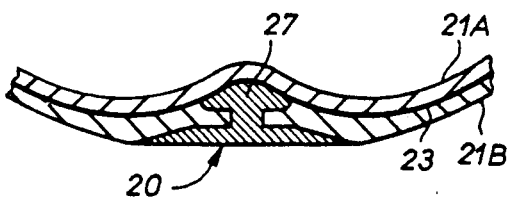
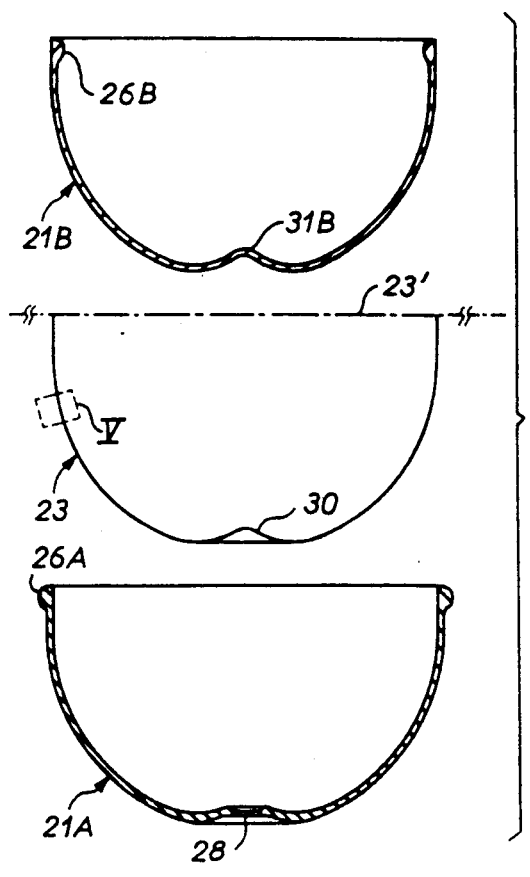
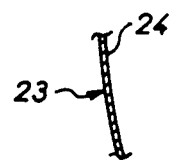
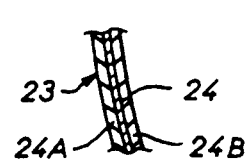
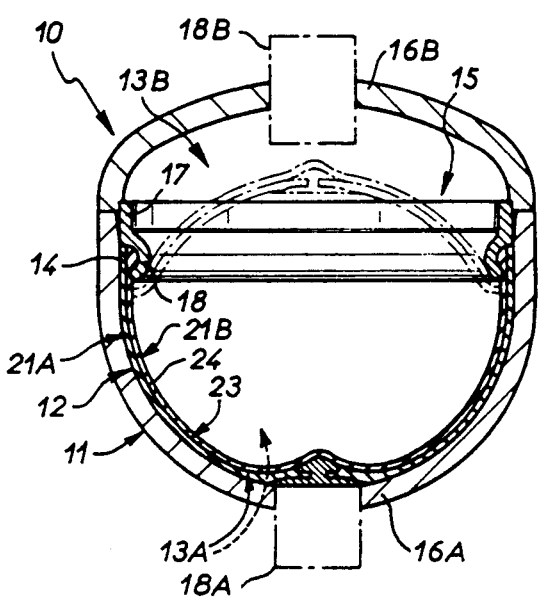

COMPOSITE MATERIAL FLEXIBLE SEPARATORS FOR PRESSURE VESSELS

BACKGROUND OF THE INVENTION

1. Field of the invention

The present invention is generally concerned with pressure vessels of the type used as pressure accumulators or transmitters, for example.

It is more particularly directed to the case where a pressure vessel of this kind comprises, within a rigid body, a diaphragm type flexible separator which, to separate two different fluids, divides the interior volume of the body into two separate chambers, an edge of the flexible separator being engaged with a support member fastened to said body which holds said edge against said inside surface of said body.

In the case of a pressure accumulator to be branch-connected to a hydraulic circuit, for example, one of the two chambers is a gas chamber, meaning a sealed chamber holding a specific quantity of gas under pressure, while the other is a liquid chamber, this other chamber being adapted to be put in communication with the hydraulic circuit concerned.

2. Description of the Prior Art

One problem to be overcome in producing pressure vessels of this type arises from the fact that the flexible separator must have a number of characteristics which are difficult to reconcile.

It must have some capacity for elastic deformation, with the result that it must be made from a deformable material, it must be temperature-resistant, and it must be capable of resisting attack by the fluids with which it comes into contact, especially the liquid in the liquid chamber, particularly when this is brake fluid, as may be the case in "ABS" type brake circuits; at the same time, it must oppose any significant diffusion of the gas in the associated gas chamber into this liquid.

Any such diffusion of gas into the liquid could interfere dangerously with the hydraulic circuit concerned.

Deformable materials with satisfactory properties in terms of their being impermeable to gases are usually incompatible with particular fluids, including brake fluid, and/or are not suitable for particular conditions of use, including those involving temperature.

To make a butyl type elastomer more gas-tight, for example, it is necessary to incorporate a filler which makes it sensitive to brake fluid.

It has long been proposed to make the flexible separator a composite member in order to dissociate the functions that it has to fulfil in order to circumvent problems of this kind.

This is the case, for example, in French patent No 1.272.420 in which the flexible separator comprises two separate walls, the outer wall of elastic material being designed to make the combination compatible with the liquid concerned while the inner wall is made from a non-elastic material chosen to be impermeable to gases.

This is also the case in French patent No 2.443.622.

In a known arrangement of the same kind the separator is made from three adjoining layers of deformable material, namely inner and outer elastic layers and an intermediate layer with low permeability to gases; it has the disadvantage that some gas can nevertheless migrate into the liquid after prolonged use.

An arrangement of this kind is referred to in the published French patent application No 2.603.075.

In this application there is disclosed the use of a gas-permeable intermediate layer constituting a kind of drain which captures the gas diffusing through the inside layer which is then evacuated to the exterior of the rigid body.

Because of the systematic loss of gas that occurs a pressure vessel of this kind necessarily has only a limited service life.

It is thus insuitable for some applications, and in particular in the "ABS" type brake circuits which are of particular relevance in this application, which must have a service life equal to that of the vehicle concerned.

If a truly gas-impermeable intermediate layer is used the problems arise in connection with this intermediate layer, both with regard to its material and its geometry.

In the French patent No 1.272.420 the gas-impermeable layer which forms a separate wall is made from polyurethane and is in the form of a kind of bellows which is deployed to a greater or lesser extent according to the quantity of gas.

Apart from the fact that a wall of this kind is difficult to make, polyurethane is not entirely satisfactory when particularly high impermeability to gases is required.

Also, in the context of high-speed and numerous repetitive cycles as is the case in "ABS" type brake circuits, the mechanical strength of an intermediate layer implemented in this way may prove to be inadequate.

A general object of the present invention is an arrangement providing a particularly satisfactory and sure solution to the problem of implementing a flexible separator that is compatible with an aggressive liquid but has very high impermeability to gases, much higher than in the currently known prior art.

SUMMARY OF THE INVENTION

In one aspect, the invention consists in a composite flexible separator for a pressure vessel comprising three adjacent layers of deformable material, namely an outer layer, an inner layer and an intermediate layer which is at least partly impermeable to gases and comprises a metal film; another object of the invention is a pressure vessel incorporating a flexible separator of this kind.

It is well known that metal films are impermeable to gases; this is because of the molecular structure of the metal from which they are made.

However, being exclusively two-dimensional, whether used alone or sandwiched between two protection films to which it adheres, a metal film does not normally lend itself to any kind of diaphragm-like conformation of the flexible separator and would normally be expected to have poor resistance to the repetitive cycles of deformation of the kind to which a flexible separator of this sort is subjected in a pressure vessel.

Those skilled in the art would therefore normally regard the use of a metal film for a flexible separator of this kind as totally unfeasible.

The present invention is based on the surprising discovery that it is in fact possible to form a metal film into a diaphragm type flexible separator and that, providing certain precautions are observed, the metal film retains its integrity even when subjected to repetitive cycles of deformation.

With regard to the first of these aspects, it has been discovered that, as confirmed by experiment, it is totally feasible to conform an initially flat blank into a flexible separator diaphragm, even if the blank includes or consists of a metal film.

With regard to the second aspect, it has been discovered that to preserve the integrity of the metal film incorporated in the intermediate layer of the separator in accordance with the invention, and as is confirmed by fatigue tests, it is necessary for the inside layer, constituting a protection layer, to be adapted to hold the intermediate layer in the area of the neutral fiber of the system. The inside layer of the flexible separator in accordance with the invention is designed accordingly.

An initially flat blank comprising or consisting of a metal film can be formed into a flexible separator diaphragm by a known hydroforming technique, for example.

In another aspect, the present invention consists in a method of manufacturing a composite flexible separator for a pressure vessel comprising three adjacent layers of deformable material, namely an outer layer, an inner layer and an intermediate layer which is at least partly impermeable to gases and comprises a metal film, in which method each layer is fabricated separately and said layers are then successively nested inside each other.

Experience shows, however, that forming the metal in this way can create internal stresses which make the metal fragile and may in subsequent service give rise to cracks which propagate in an uncontrolled manner and compromise the required seal.

For this reason, in a further aspect the invention consists in a method of manufacturing a composite flexible separator for a pressure vessel comprising three adjacent layers of deformable material, namely an outer layer, an inner layer and an intermediate layer which is at least partly impermeable to gases and comprises a metal film, in which method each layer is fabricated separately and said layers are then successively nested inside each other, said metal film of said intermediate layer is at least partly divided into film elements, said film elements being at least contiguous with each other in the rest configuration of said separator, and an initially flat blank is cut to form individualized film elements separated from each other over part at least of their contour and adapted by virtue of said contour to be at least contiguous with each other when the intermediate layer formed in this way is fitted between said inner and outer layers.

In a first form of this method these film elements are contiguous at their edges in the rest configuration of the separator.

In this case some limited lack of sealing between the film elements is acceptable if these elements move slightly apart when the flexible separator departs from its rest configuration.

The time for which the flexible separator is in the rest configuration or a configuration very close to this is in practise a very large majority of the time.

What is more, calculations indicate and experience confirms that, taken overall, the degree of impermeability to gases remains very high, being significantly greater than 90% or even 95%.

However, in a preferred second form of the method the film elements overlap at least in part along their lateral edges.

The impermeability to gases is then even higher.

In all cases as the film elements are individually of only limited size the limited forming to which they are subject after they are cut out from the flat, when the three layers are assembled and pressed together, is advantageously not likely to produce internal stresses likely to give rise afterwards to any cracking.

Thus with a flexible separator produced by this method in accordance with the invention there is not observed in service any cracking in the film elements of the metal film that it comprises and consequently the amount of gas leaking through this flexible separator advantageously remains stable with time.

Finally, this method in accordance with the invention is favorable to industrialization of the manufacture of the flexible separator, as it facilitates the forming of the metal film of its intermediate layer, especially when, as in a preferred embodiment, the film elements cut from the metal film remain joined together.

The published Japanese utility model No 63-190902 proposes the subdivision into film elements of a metal film used to control the gas impermeability of a flexible separator.

Apart from the fact that in this Japanese utility model the metal film is disposed on the surface of the flexible separator, it is divided into film elements only after it is applied to the separator, by virtue of lines of reduced strength formed on it for this purpose.

It therefore provides no answer to the problem of forming an initially flat film to the configuration of the flexible separator of which it is to form part and, what is more, there is no means of ensuring that the required subdivision is achieved exactly as intended, with the attendant risk of producing internal stresses likely to cause cracking subsequently.

This is not the case with the method in accordance with the invention as the metal film used is divided from the outset, while still flat, into film elements into a systematic and therefore perfectly controlled way.

Furthermore, there is every reason to believe that the rate of leakage of gas through the flexible separator described in the Japanese utility model when in service is very high precisely because of the subdivision of the film.

Because this subdivision is done in situ, on the surface of the flexible separator, the resulting film elements can at best be only contiguous.

This is not so with the method in accordance with the invention in which, if required, the film elements can successively overlap each other.

The American patent U.S. Pat. No. 3,526,580 proposes the use of a metal layer to improve the gas-tightness of a separator.

In this American patent, however, the separator comprises multiple metal layers and is therefore essentially metallic, none of the metal layers being sandwiched between two synthetic material protective films.

Also, the metals used are in succession lead, silver and indium, there being no mention of aluminum.

Finally, and most importantly, there is no use in the separator which is the subject matter of this American patent of any metal "film" in the sense used in connection with the present invention, that is to say of preformed metal film; to the contrary, the corresponding metal layers are formed in situ on a synthetic material support film by chemical and subsequently electrolytic deposition.

This American patent is therefore concerned with a separator having characteristics completely different to those of the separator in accordance with the invention.

The characteristics and advantages of the invention will emerge from the following description given by way of non-limiting example only and with reference to the appended diagrammatic drawings.

BRIEF DESCRIPTION OF THE DRAWINGS

FIG. 1 is a view in axial cross-section of a flexible separator in accordance with the invention.

FIGS. 2 and 3 respectively show to a larger scale the details of FIG. 1 marked II, III thereon.

FIG. 4 is an exploded view in axial cross-section analogous to that of FIG. 1 and showing separately each of the component layers of the flexible separator in accordance with the invention.

FIG. 5 shows to a larger scale the detail of FIG. 4 marked V thereon.

FIG. 6 is a view analogous to that of FIG. 5 for an alternative embodiment of the layer concerned.

FIG. 7 is a view in axial cross-section and to the same scale as FIG. 1 of a pressure vessel fitted with a flexible separator in accordance with the invention.

DETAILED DESCRIPTION OF THE INVENTION

Figure 8:
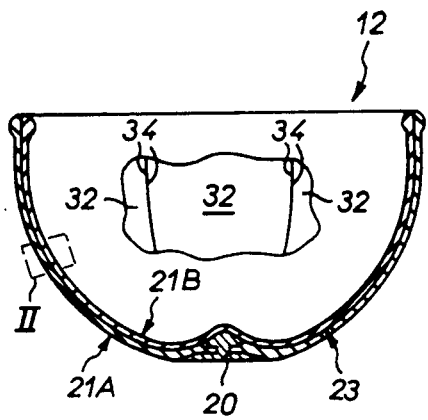
FIG. 8 is locally cut away view in axial cross-section analogous to that of FIG. 1 for an alternative embodiment.

As shown in the figures, and in FIG. 7 in particular, a pressure vessel 10 comprises a rigid body 11 and, inside the rigid body 11, a flexible separator diaphragm 12 in the form of a cup or bladder which separates the interior volume of the rigid body 11 into two separate members 13A, 13B. The edge 14 of said flexible separator 12 is engaged with a support member 15 fastened to the rigid body 11 and holding said edge 14 against the inside surface of the latter.

In the embodiment shown the rigid body 11 comprises two shells 16A, 16B butted up against each other and appropriately fastened to each other, in practise by welding. A lower shell 16A forms a base and an upper shell 16B forms a lid.

In this embodiment the support member 15 is an annular member having a cylindrical part 17 by means of which it is applied to the inside surface of the lower shell 16A of the rigid body, to which it is appropriately attached, in practise by welding, and a hook-shape part 18 by means of which it grips the edge 14 of the flexible separator 12 applying the edge 14 to the inside surface of the lower shell 16A.

The shells 16A, 16B and the support member 15 may be made from metal, for example.

As shown in chain-dotted outline in FIG. 7, the assembly is completed on the side of the chamber 13B, which is in practise a gas chamber, by a valve 18B by means of which the gas chamber 13B can be filled with gas and, on the side of the chamber 13A, which is in practise a liquid chamber and which in FIG. 7 is of zero volume, by a pipe 18A adapted to connect the liquid chamber 13A to a hydraulic circuit, the pipe 18A defining an orifice for the liquid to pass through which is not shown in detail in FIG. 7 and which is controlled by a valve in the form of a button 20 at the base of the flexible separator 12.

As these arrangements are well known in themselves and do not of themselves constitute any part of the present invention they will not be described in more detail here.

In a way that is also known in itself the flexible separator is a composite separator comprising three adjoining layers, an outside deformable material layer 21A, an inside layer 21B and an intermediate layer 23 which is at least partially impermeable to gases.

In accordance with the invention the intermediate layer 23 comprises a metal film 24.

It may comprise only a metal film 24, for example (FIG. 5).

Alternatively (FIG. 6) it is formed by a metal film 24 sandwiched between two synthetic material protective films 24A, 24B, one on the outside and the other on the inside, to which it adheres, as in the composite films marketed under the brand name "VALERON", for example.

Be this as it may, the metal film 24 is an aluminum film, for example.

It is extremely thin, having a thickness in the order of 0.01 to 0.1 mm, for example.

If the metal film 24 is used in isolation its thickness may be in the order of 0.075 mm, for example.

When it is sandwiched between two protective films 24A, 24B its thickness may be in the order of 0.02 mm, the two protective films 24A, 24B themselves having a thickness in the order of 0.03 mm.

Of course, the above numerical values are given by way of example only and are in no way limiting on the invention.

The outside layer 21A and the inside layer 21B are preferably made from an elastically deformable material.

In practise they are made from an elastomer such as a butyl type elastomer, for example.

In order to form a bead 25 adapted to cooperate with the hook-shape part 18 of the support member 15 they each comprise at their edge a respective bead 26A, 26B projecting radially outwards in the case of the outer layer 21A and projecting radially inwards in the case of the inside layer 21B.

The thickness of the outside and inside layers 21A, 21B is in the order of 1.2 to 1.6 mm, for example, preferably in the order of 1.4 mm, for example.

As previously, the numerical values are given by way of example only without this limiting the invention.

Because the outside layer 21A is designed to be in contact with the fluid in the liquid chamber 13A it is in practise designed to be inert to this fluid.

The elastomer from which it is made is therefore a pure elastomer in practise, that is to say an elastomer free of any filler specific to achieving impermeability to gases.

With a view to simplicity and in order to facilitate the manufacture of the assembly the same goes for the inside layer 21B.

The inside layer 21B is designed to locate the intermediate layer 23 in the immediate vicinity of the neutral fiber zone of the assembly where the material is neither compressed nor stretched in the course of bending.

It then advantageously controls the radius of curvature of the intermediate layer 23.

Notwithstanding what has been said previously, the material from which the inside layer 21B is made is less flexible than that from which the outside layer 21A is made, for example, and the latter is thicker than the inside layer 21B.

Alternatively, the material from which the outside layer 21A is made is more flexible than that from which the outside layer 21A is made and the latter is thinner than the inside layer 21B.

In one embodiment with which very good results have been achieved the materials from which the inside and outside layers 21B and 21A are made have the same flexibility and the inside layer 21B and the outside layer 21A have substantially the same thickness.

As shown, the various component layers 21A, 23, 21B of the flexible separator 12 in accordance with the invention are preferably adjacent each other.

They are preferably not fastened together in any way, so that in service they are able to move relative to each other, which reduces the internal stresses in them.

They may be fastened together, for example glued together, if required, however.

As shown, the button 20 carried by the flexible separator 12 in accordance with the invention is preferably attached only to the outside layer 21A, said button 20 comprising a projecting peg 27 by means of which it is snap-fastened into an axial hole 28 in said outside layer 21A.

The intermediate layer 23 and the inside layer 21B comprise respective and corresponding dome-shaped local deformations 30, 31B accommodating the peg 27.

To manufacture the flexible separator 12 in accordance with the invention its various layers 21A, 23, 21B are fabricated separately and, as schematically shown in FIG. 4, successively nested inside each other, for example in a vacuum to prevent any air pocket forming between them.

The outer layer 21A and inner layer 21B are made by molding in the usual way.

As schematically shown in chain-dotted line in FIG. 4 the intermediate layer 23 is hydroformed from an initially flat blank 23', for example.

As the hydroforming technique is well known in itself, the corresponding arrangements are not described here.

Be this as it may, the various layers 21A, 23 and 21B are made so that, in their rest configuration, their shape is complementary to that of the lower shell 16A of the rigid body 11.

In the embodiment shown this shape is that of a hemisphere surmounted by a cylindrical ring.

When the layers 21A, 23 and 21B have been made and nested inside each other the flexible separator 12 that they conjointly constitute is placed inside the lower shell 16A of the rigid body 11 engaged with the corresponding support member 15.

The latter is then welded to the lower shell 16A and the assembly is closed by the upper shell 16B.

As the corresponding arrangements are well known in themselves they will not be described here.

In its rest configuration the flexible separator 12 is forced against the inside surface of the lower shell 16A of the rigid body 11.

In service, it is deformed to a greater or lesser extent to form a liquid chamber 14A of greater or lesser size between it and the inside surface of the lower shell 16A of the rigid body 11.

In FIG. 7 its maximum deformation is shown in chain-dotted outline.

In the foregoing description the metal film 24 of the intermediate layer 23 is in one piece at all times.

This is not so in the embodiment shown in FIGS. 8 through 13.

In this embodiment the metal film 24 is at least partially separated into film elements 32 and these film elements 32 are at least contiguous with each other in the rest configuration of the flexible separator 12 as shown in FIG. 8.

Figure 10:
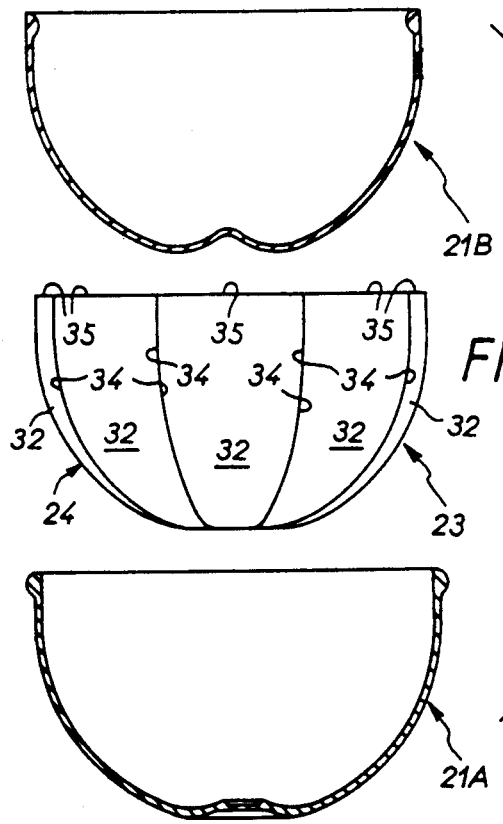
FIG. 10 is an exploded view in axial cross-section analogous to that of FIG. 4 showing the intermediate layer in this embodiment in isolation.
Figure 9:
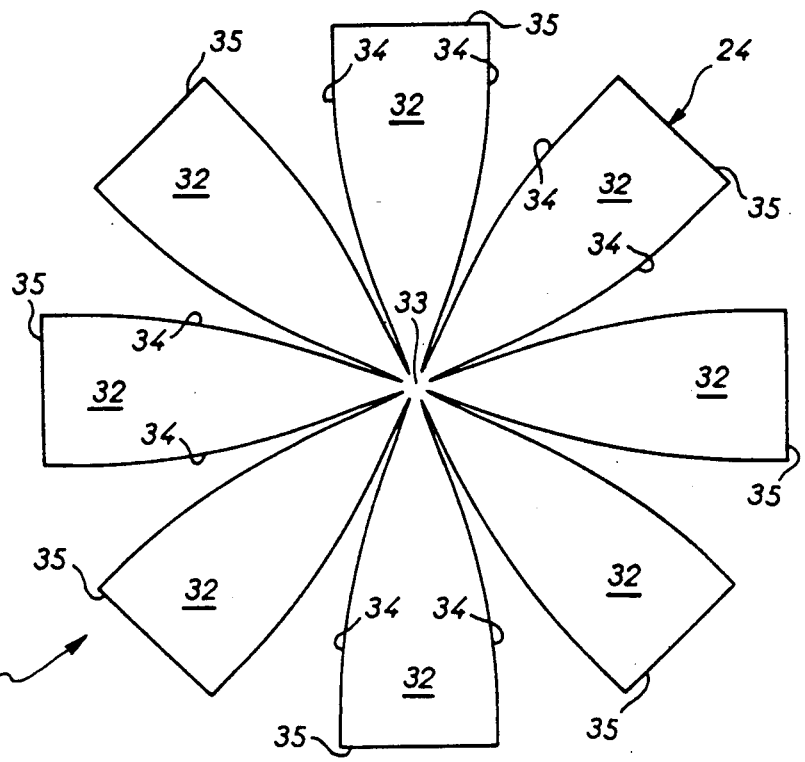
FIG. 9 shows the metal film used in this embodiment for the intermediate layer separator in accordance with the invention, shown when flat.

In the embodiment shown specifically in FIGS. 8 through 10 the film elements 32 are exactly contiguous with each other at their edges in the rest configuration of the flexible separator 12. All identical to each other, they radiate from the base of the flexible separator 12.

This intermediate layer 23 is fabricated from an initially flat blank 23' which is cut when flat as shown in FIG. 9 to produce the required individual film elements 32.

In the embodiments shown the contour of the film elements 32 is generally triangular. Radiating from a central area corresponding to the base of the flexible separator 12, their lateral edges 34 are convex, so that they subsequently come together, with a substantially straight edge 35 opposite the base.

In the embodiment specifically shown in FIGS. 8 through 10 the central area from which the film elements 32 radiate is a central pad 33 which is common to all the film elements 32 and which corresponds to the base of the flexible separator 12, all of the film elements 32 being in one piece with the central pad 33 and therefore attached to each other.

Because of the convex contour of their lateral edges 34, the film elements 32 are separated from each other in the parts of their contour corresponding both to these convex lateral edges 34 and their substantially straight edges 35.

However, in the embodiment shown in FIGS. 8 through 10 they are cut in such a way that, because of this contour, their edges are exactly contiguous with each other when, as shown in FIG. 10, the intermediate layer 23 formed by the metal film 24 divided in this way into film elements 32 is fitted between the inner and outer layers 21B and 21A.

In this configuration the convex lateral edges 34 of the film elements 32 are butted together and their substantially straight edges 35 are continuous with each other along a circumference globally corresponding to the periphery of the flexible separator 12.

In practise at least six film elements 32 are used.

There are eight of them in the embodiment shown in FIGS. 8 through 10.

The film elements 32 are therefore individually relatively small so that their shaping into the overall configuration of the flexible separator 12 does not give rise to any significant internal stresses in them.

In all other respects, this embodiment is the same as previously.

Briefly, after separate fabrication the layers 21B, 23, 21A of the flexible separator 12 are nested successively inside each other, either from the inside, starting with the outer layer 21A, as shown in FIG. 10, or from the outside, starting with the inner layer 21B, and they are adhesively bonded together in a press.

It is only during this pressing that the intermediate layer 23 is conformed to the reliefs on the outer layer 21A and the inner layer 21B to match the assembly to the shape of the button 20.

Figure 11:
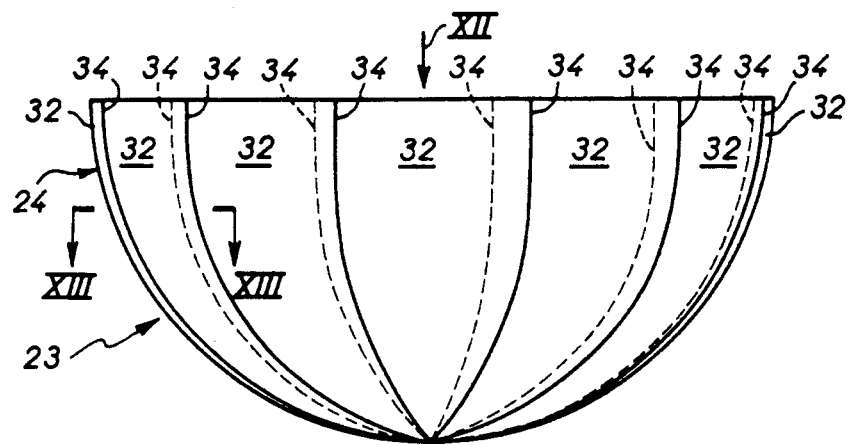
FIG. 11 is a view in axial cross-section which, repeating part of FIG. 10, relates only to the metal film used in this embodiment.
Figure 12:
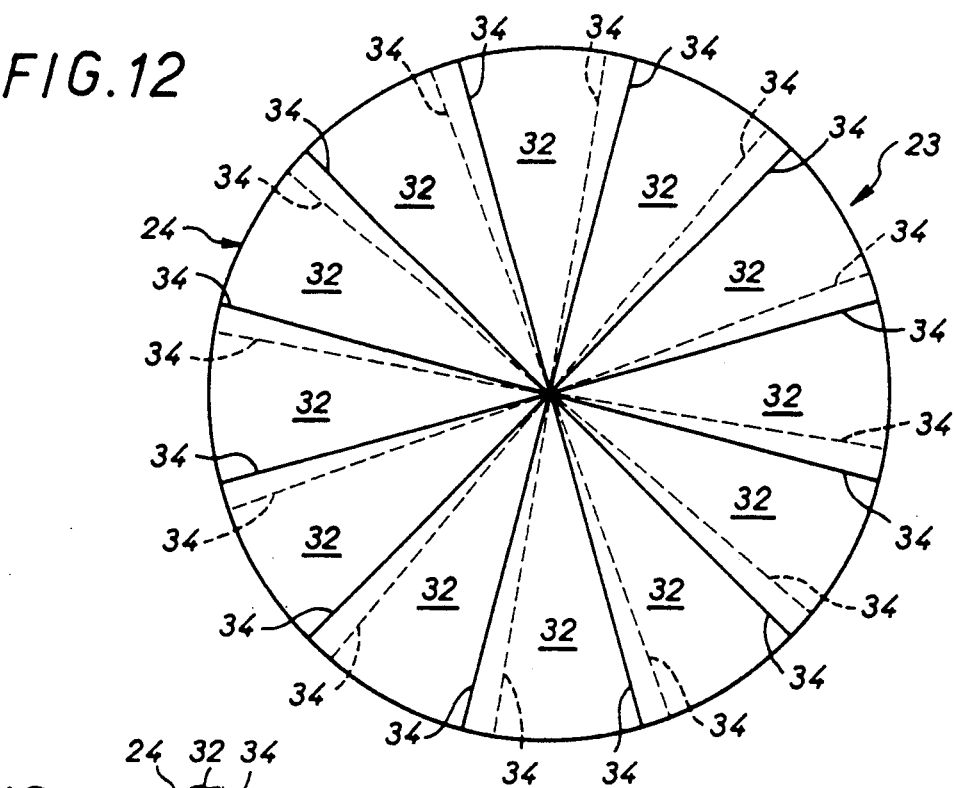
FIG. 12 is a plan view of the metal film as seen in the direction of the arrow XII in FIG. 11.
Figure 13:
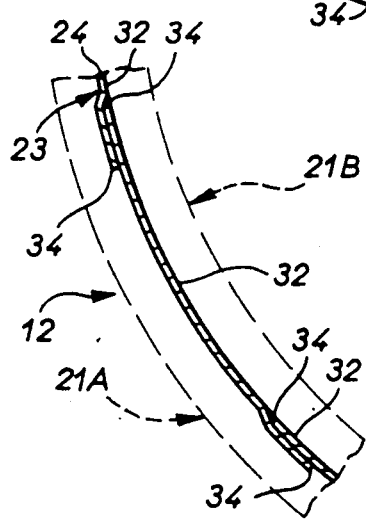
FIG. 13 is a view of it to a larger scale and in transverse cross-section on the line XIII—XIII in FIG. 11.

In the embodiment shown in FIGS. 11 through 13 the arrangement is such that in the rest configuration of the flexible separator 12 the successive film elements 32 of the metal film 24 of the intermediate layer 23 overlap each other at least in part along their lateral edges 34.

In the embodiment shown there are 12 of these film elements 32.

To give a specific example, the degree to which one overlaps another is in the order of 10%.

Otherwise the arrangements are of the same kind as previously described.

Of course, the present invention is not limited to the embodiments described and shown but encompasses any variant execution, in particular with regard to the number and/or the shape of the film elements when the metal film is divided into film elements in this way.

What is more, these film elements are not necessarily identical.

Furthermore, instead of being joined and therefore fastened together by a pad, they may be separate.

Finally, although in the foregoing description the intermediate layer of the flexible separator in accordance with the invention is a metal film it may equally well be formed, as mentioned with reference to FIGS. 1 through 7, for example, by a composite film in which a metal film is sandwiched between two synthetic material protective films to which it adheres.

Obviously in this case the blank from which the film elements must be cut out is a blank formed by the combination of these films.

There is claimed:

1. Composite flexible separator for a pressure vessel comprising three adjacent layers of deformable material including an outer layer, an inner layer and an intermediate layer which is at least partly impermeable to gases and comprises a metal film, said metal film of said intermediate layer being at least partially divided into film elements which are at least contiguous with each other in a rest configuration of the separator.

2. Flexible separator according to claim 1 wherein said metal film of said intermediate layer is in one piece.

3. Flexible separator according to claim 1 wherein, in said rest configuration of said separator, said successive film elements overlap at least in part along their lateral edges.

4. Flexible separator according to claim 1 wherein said film elements are identical and radiate from the base of the separator.

5. Flexible separator according to claim 4 wherein said film elements have a substantially triangular contour with convex lateral edges radiating from the base of said separator and a substantially straight side opposite said base.

6. Flexible separator according to claim 4 comprising at least six of said film elements.

7. Flexible separator according to claim 6 comprising at least eight of said film elements.

8. Flexible separator according to claim 4 wherein all said film elements are in one piece with a central pad common to them and which corresponds to the base of the separator.

9. Flexible separator according to claim 1 wherein said intermediate layer is a metal film.

10. Flexible separator according to claim 1 wherein said metal film of said intermediate layer is sandwiched between two synthetic material protective films to which it adheres.

11. Flexible separator according to claim 1 wherein said metal film of said intermediate layer is an aluminum film.

12. Flexible separator according to claim 1 wherein said outer and inner layers are made from an elastically deformable material such as an elastomer.

13. Flexible separator according to claim 1 wherein at least said outer layer is adapted to be in contact with a specific fluid and is inert with respect to said fluid.

14. Flexible separator according to claim 1 wherein said intermediate layer is located in the immediate vicinity of a of neutral zone of the separator.

15. Flexible separator according to claim 14 wherein the material of said inner layer is less flexible than that of said outer layer and the latter is thicker than said inner layer.

16. Flexible separator according to claim 14 wherein the material of said inner layer is more flexible than that of said outer layer and the latter is thinner than said inner layer.

17. Flexible separator according to claim 14 wherein the materials of said inner and outer layers have the same degree of flexibility and said inner and outer layers have substantially the same thickness.

18. Flexible separator according to claim 1 the various layers of which are separate.

19. Flexible separator according to claim 1 comprising a button attached only to said outer layer, said button comprising a peg by means of which it is snap-fastened to said outer layer by means of a hole therein, said intermediate layer and said inner layer each comprising in corresponding relationship a dome-shape local deformation to accommodate said peg.

20. Method of manufacturing a composite flexible separator for a pressure vessel comprising three adjacent layers of deformable material, namely an outer layer, an inner layer and an intermediate layer which is at least partly impermeable to gases and comprises a metal film, in which method each layer is fabricated separately and said layers are then successively nested inside each other.

21. Method according to claim 20 wherein said metal film of said intermediate layer is in one piece and is hydroformed from an initially flat blank.

22. Method according to claim 20 wherein said metal film of said intermediate layer is at least partly divided into film elements, said film elements being at least contiguous with each other in a rest configuration of said separator, in which method an initially flat blank is cut to form individualized film elements separated from each other over part at least of their contour and adapted by virtue of said contour to be at least contiguous with each other when the intermediate layer formed in this way is fitted between said inner and outer layers.

23. Pressure vessel comprising a rigid body and, in said rigid body, a composite flexible diaphragm separator comprising three adjacent layers of deformable material, including an outer layer, an inner layer and an intermediate layer which is at least partly impermeable to gases and comprises a metal film, said metal film of said intermediate layer being at least partially divided into film elements which are least contiguous with each other in a rest configuration of the separator, said flexible separator dividing the interior volume into two separate chambers, said flexible separator having its edge engaged with a support member fastened to said rigid body and holding said edge against the interior surface of the same.

24. Pressure vessel according to claim 23 wherein, in a rest configuration, said flexible separator is forced against the inside surface of said rigid body.

* * * * *